US 6,629,718 B2

(12) United States Patent
Bauer et al.

(10) Patent No.: US 6,629,718 B2
(45) Date of Patent: Oct. 7, 2003

(54) MOTOR VEHICLE HAVING A FIXED ROOF WHICH CAN BE OPENED AND METHOD OF MAKING SAME

(75) Inventors: Ulrich Bauer, Aidlingen (DE); Thomas Baessler, Holzgerlingen (DE); Michael Koch, Sindelfingen (DE); Stefan Orth, Althengstett (DE); Juergen Schrader, Weil im Schoenbuch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/206,937

(22) Filed: Jul. 30, 2002

(65) Prior Publication Data

US 2003/0020299 A1 Jan. 30, 2003

(30) Foreign Application Priority Data

Jul. 30, 2001 (DE) .......................................... 101 37 023

(51) Int. Cl.⁷ ................................ B60J 1/14; B60J 7/08
(52) U.S. Cl. ............. 296/108; 296/107.07; 296/107.17; 296/107.04; 296/146.14
(58) Field of Search ................................. 296/108, 121, 296/107.04, 107.07, 107.08, 107.16, 107.17, 146.14

(56) References Cited

U.S. PATENT DOCUMENTS

| | | | | |
|---|---|---|---|---|
| 3,536,354 A | * | 10/1970 | Ingram | 296/147 |
| 4,693,509 A | * | 9/1987 | Moy et al. | 296/201 |
| 6,123,381 A | * | 9/2000 | Schenk | 296/107.07 |
| 6,131,988 A | * | 10/2000 | Queveau et al. | 296/107.17 |
| 6,283,532 B1 | * | 9/2001 | Neubrand | 296/107.07 |
| 6,382,703 B1 | * | 5/2002 | Queveau et al. | 296/107.17 |
| 6,425,621 B2 | * | 7/2002 | Miklosi et al. | 296/108 |
| 6,454,342 B2 | * | 9/2002 | Heselhaus et al. | 296/107.07 |
| 6,478,362 B2 | * | 11/2002 | Obendiek | 296/108 |
| 6,497,446 B2 | * | 12/2002 | Obendiek | 296/107.17 |
| 6,536,831 B2 | * | 3/2003 | Rothe et al. | 296/107.07 |

FOREIGN PATENT DOCUMENTS

| DE | 197 51 660 | 3/1999 |
|---|---|---|
| DE | 19751660 | 3/1999 |
| DE | 19932503 | 10/2001 |

* cited by examiner

Primary Examiner—Stephen T. Gordon
Assistant Examiner—Greg Blankenship
(74) Attorney, Agent, or Firm—Crowell & Moring LLP

(57) ABSTRACT

A motor vehicle having a fixed roof is provided which can be opened and has a front and a rear roof part which are connected to each other in an articulated manner and, controlled by a main link arrangement, can be shifted between a closing position and a storage position in a rear storage space, having a fixed rear window which is mounted pivotably on lateral roof pillars and the pivot axis of which runs in the central region of the rear window in the transverse direction of the vehicle. The rear window is driven in a rotational manner relative to the roof pillars during the opening and closing movement of the fixed roof, and the rear window, after reaching the closing position of the fixed roof, is pressed via the rotational drive against a sealing seat interacting with the rear window. A supporting arrangement is provided, the arrangement comprising at least one supporting element which, when pushed forward, enables the rear window to be acted upon by a rotational force ensuring the sealing seat of the rear window.

25 Claims, 7 Drawing Sheets

MOTOR VEHICLE HAVING A FIXED ROOF WHICH CAN BE OPENED AND METHOD OF MAKING SAME

BACKGROUND AND SUMMARY OF THE INVENTION

This application claims the priority of German Patent Document DE 101 37 023-7-21, filed on Jul. 30, 2002, the disclosure of which is expressly incorporated by reference herein.

The invention relates to a motor vehicle having a fixed roof which can be opened and has a front and a rear roof part which are connected to each other in an articulated manner and, controlled by way of a main link arrangement, can be shifted between a closing position and a storage position in a rear storage space, having a fixed rear window which is mounted pivotably on lateral roof pillars and a pivot axis which runs in a central region of the rear window in a transverse direction of the vehicle, the rear window being driven in a rotational manner relative to the roof pillars during opening and closing movement of the fixed roof, and the rear window, after reaching the closing position of the fixed roof, being pressed via a rotational drive against a sealing seat interacting with the rear window.

A motor vehicle of this type having a fixed roof which can be opened and which comprises a front and a rear roof part is known from German Patent Document DE 197 51 660 C1, corresponding to U.S. Pat. No. 6,123,381. The two roof parts are connected to each other in an articulated manner and, controlled by means of a main link arrangement, can be shifted between a closing position and a storage position in a rear storage space. The rear roof part comprises a fixed rear window which is mounted pivotably on lateral roof pillars and the pivot axis of which runs in the central region of the rear window in the transverse direction of the vehicle. In order to store the rear window in a space-saving manner in the rear storage space with its curvature in the same direction as the front roof part, the said rear window is driven in a rotational manner relative to the roof pillars during the opening and closing movement of the fixed roof. A further lever arrangement coupled to the main link arrangement is used here as the rotational drive. After the fixed roof is closed, the rear window is pressed by means of the rotational drive against a sealing seat interacting with it. In order for the rear window to be sufficiently sealed against the sealing seat, the rotational drive has to produce a considerable force.

An aspect of the invention is therefore to provide a motor vehicle of the type mentioned at the beginning, in which the rear window is sealed against the sealing seat in a simplified and more reliable manner.

This aspect is achieved according to certain preferred embodiments of the invention by providing a supporting arrangement which comprises at least one supporting element which, when pushed forward, enables the rear window to be acted upon by a rotational force ensuring the sealing seat of the rear window.

Advantageous refinements of the invention are to be gathered from the preferred embodiments.

In the case of the motor vehicle according to certain preferred embodiments of the invention, a supporting arrangement having at least one supporting element is provided, which supporting element, when pushed forward enables the rotatable rear window to be acted upon by a further rotational force which ensures the sealing seat of the rear window. In other words, the supporting arrangement enables the rear window, which is already pressed against the seal by way of the rotational drive, to be further rotated through a small angular extent in order to achieve an improved sealing seat. This also enables the rotational drive to be simplified and to be of smaller dimensions, since the sealing force can be applied by the supporting arrangement.

The use of two supporting elements has proven particularly advantageous, the supporting elements interacting in a mirror-symmetrical arrangement with associated, lateral edge zones of the rear window in a manner which is space-saving and inconspicuous for the occupants.

A supporting arrangement which is attached to the associated main link can be designed in a particularly simple manner. As a result, when the roof is closed, the supporting arrangement automatically moves into its supporting position.

If means for centering the rear window are provided at a distance below the pivot axis, then, firstly, good positioning of the rear window and, secondly, improved torsional reinforcement of the roof in the region of the rear roof part can be achieved. The torsional reinforcement is particularly good if a respective centering element is arranged in a mirror-symmetrical arrangement on the lateral roof pillars, the said centering element interacting with a corresponding centering element of the rear window.

Other objects, advantages and novel features of the present invention will become apparent from the following detailed description of the invention when considered in conjunction with the accompanying drawings.

DETAILED DESCRIPTION OF THE DRAWINGS

Figure 1:
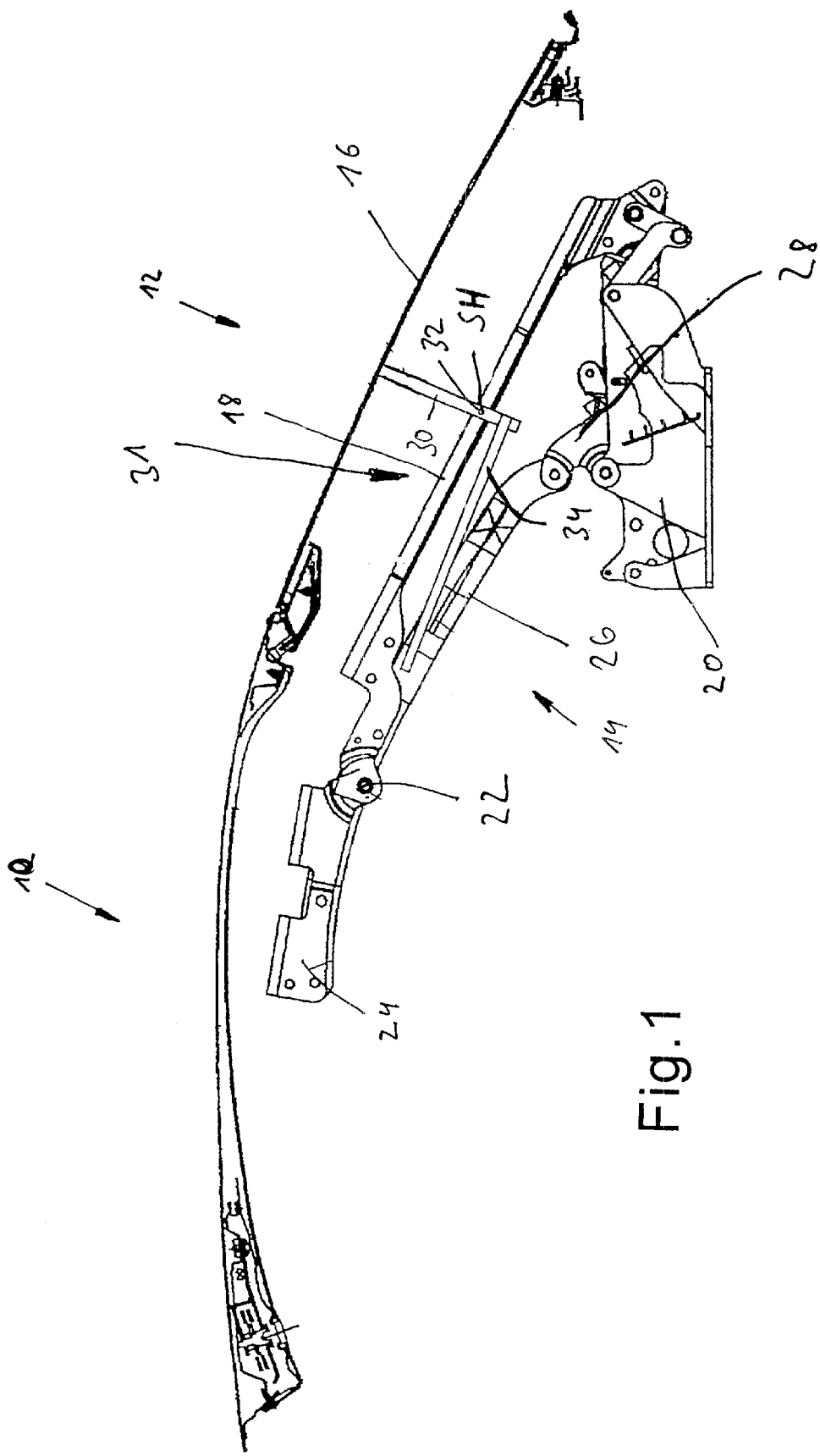
FIG. 1 shows a schematic sectional view of the closed fixed roof along the central longitudinal plane of the motor vehicle together with the front and rear roof part which are connected to each other in an articulated manner and with the main link arrangement for opening the roof.

FIG. 1 illustrates, in a schematic sectional view along the central longitudinal plane, the fixed roof, which can be opened, of a motor vehicle, in the closed state. The fixed roof comprises a front and rear roof part 10, 12 which are connected to each other in an articulated manner, the front side of the front roof part 10 adjoining a windscreen frame (not shown) and the rear side of the rear roof part 12 ending level with the tailgate of the motor vehicle. The front and rear roof part 10, 12, controlled by way of a main link arrangement 14 (explained in greater detail below), can be shifted between the closing position (shown here) and a storage position (shown in FIG. 4) in a rear storage space.

The rear roof part 12 comprises, as basic parts, a fixed rear window 16 made of glass or plastic and lateral C-pillars or roof pillars 18, the rear window 16 being mounted (in a manner also described below) on the lateral roof pillars 18 in a manner such that it can pivot about a pivot axis SH running in its central region in the transverse direction of the vehicle. At the rear end, the lateral C-pillars are connected to a main bearing 20, in each case in an articulated manner, while at their front ends they each have a main pivot point 22 on which a hinge 24 for the front roof part 10 is also articulated. Articulated on that end of the hinge 24 which faces away from the main pivot point 22 is an end, which is concealed in FIG. 1, of a main link 26 of the main link arrangement 14, the other end of which is connected to the main bearing 20 via an intermediate lever 28. The two main links 26 run laterally in the vicinity of the C-pillars.

Figure 5:
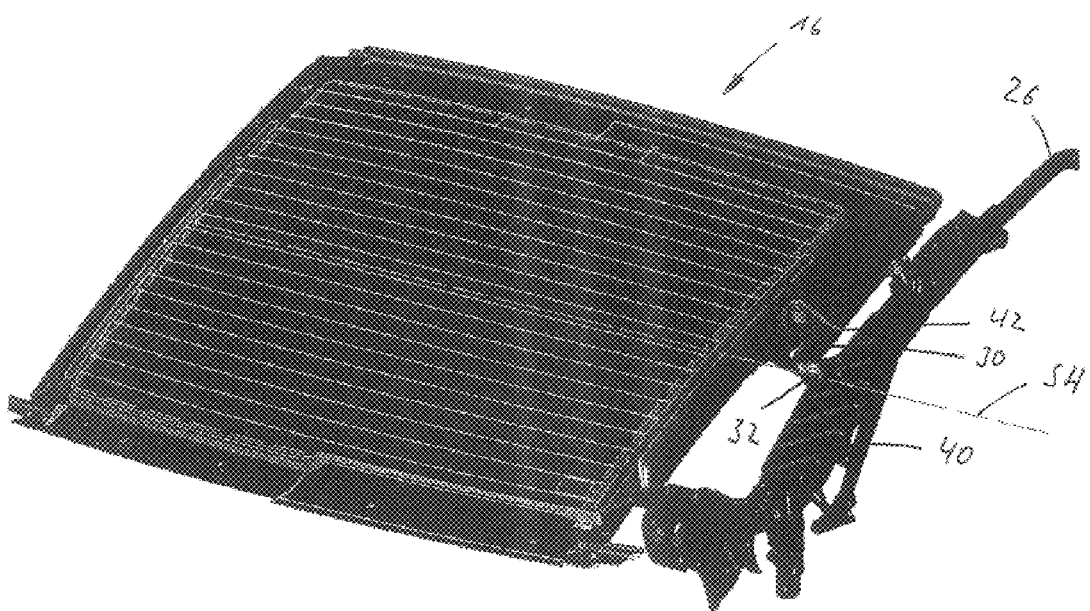
FIG. 5 shows a schematic partial perspective view from the right at the front in the direction to the rear at the top of the rear roof part and one of the main links in the closed state of the roof.
Figure 6:
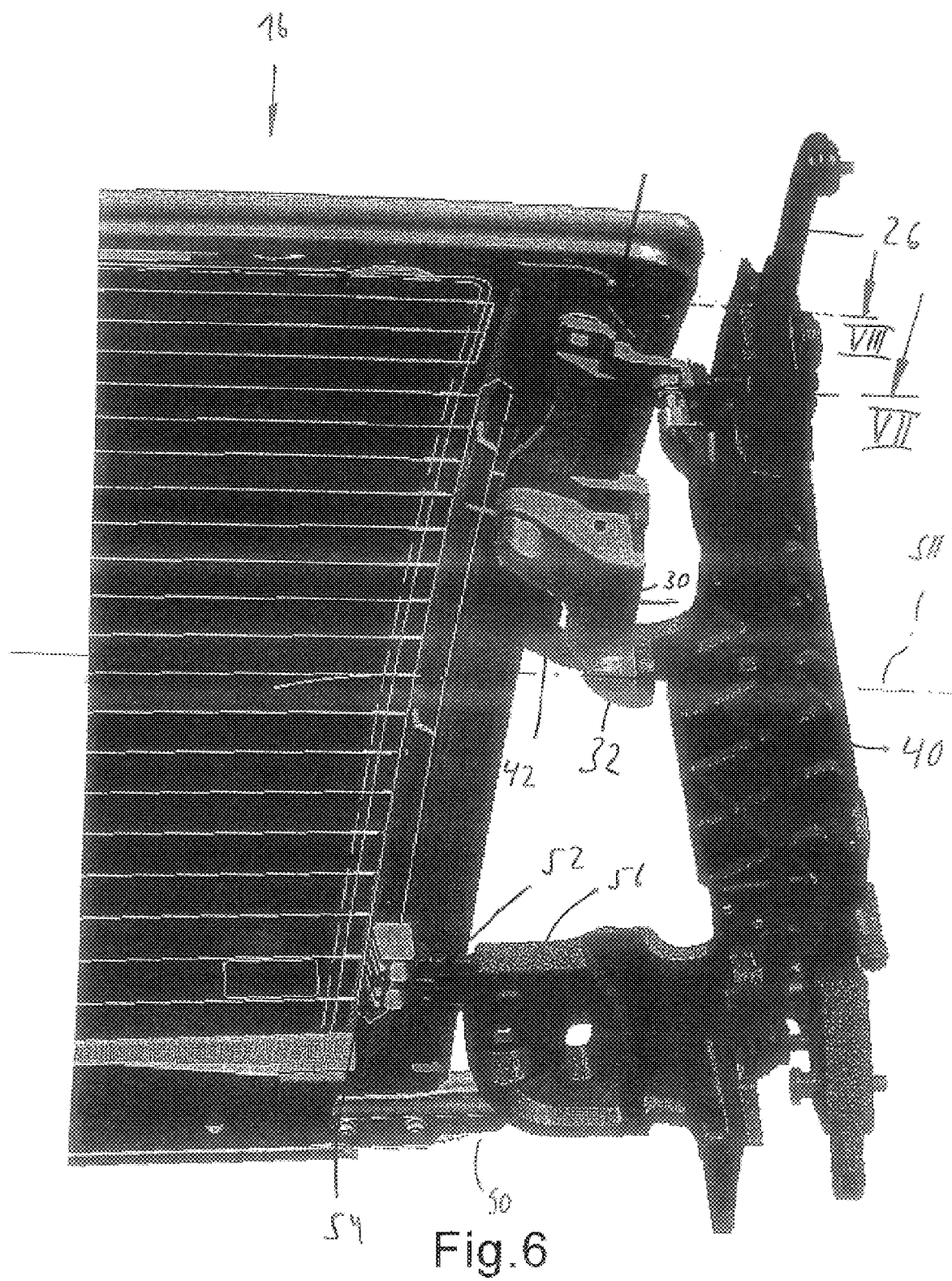
FIG. 6 shows an enlarged partial perspective view of the rear roof part shown in FIG. 5 and the main link in the region of the roof pillar.

The rear window 16 is rigidly connected, in a manner to be explained in greater detail in conjunction with FIGS. 5 and 6, fixedly to a lever 30 of a rotational drive 31, the lever protruding inwards in the central region of the rear window 16 and being connected pivotably to the C-pillar 18 in each case in an articulated manner via a pivot point 32. At its end facing the pivot point 32, the lever 30 is connected fixedly to a restraint lever 34 which is articulated in turn on the associated main link 26 by its end facing away from the lever 30.

Figure 2:
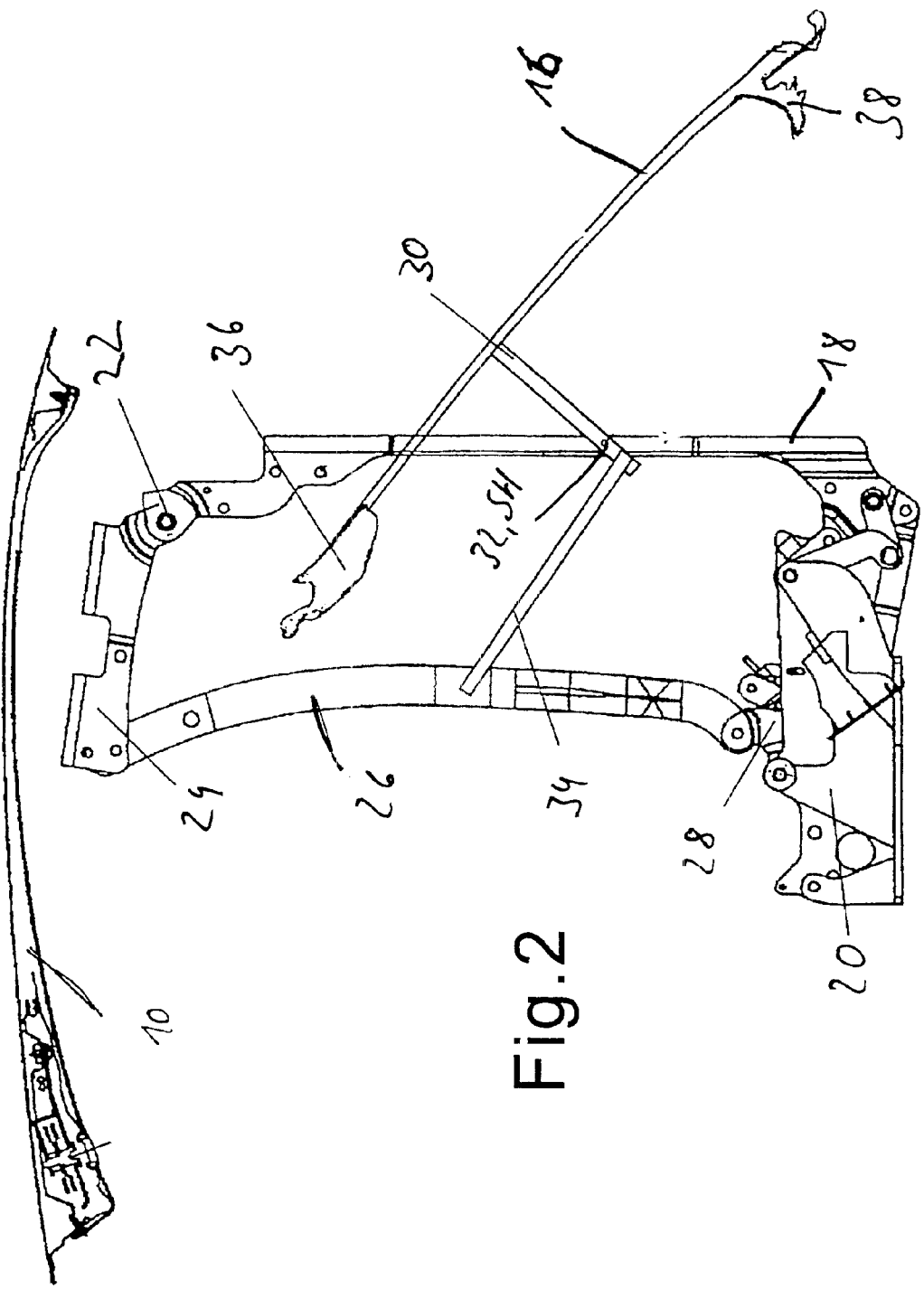
FIGS. 2 and 3 show a schematic sectional view of the fixed roof during a first and second stage of the storing process of the roof in a rear storage space.
Figure 3:
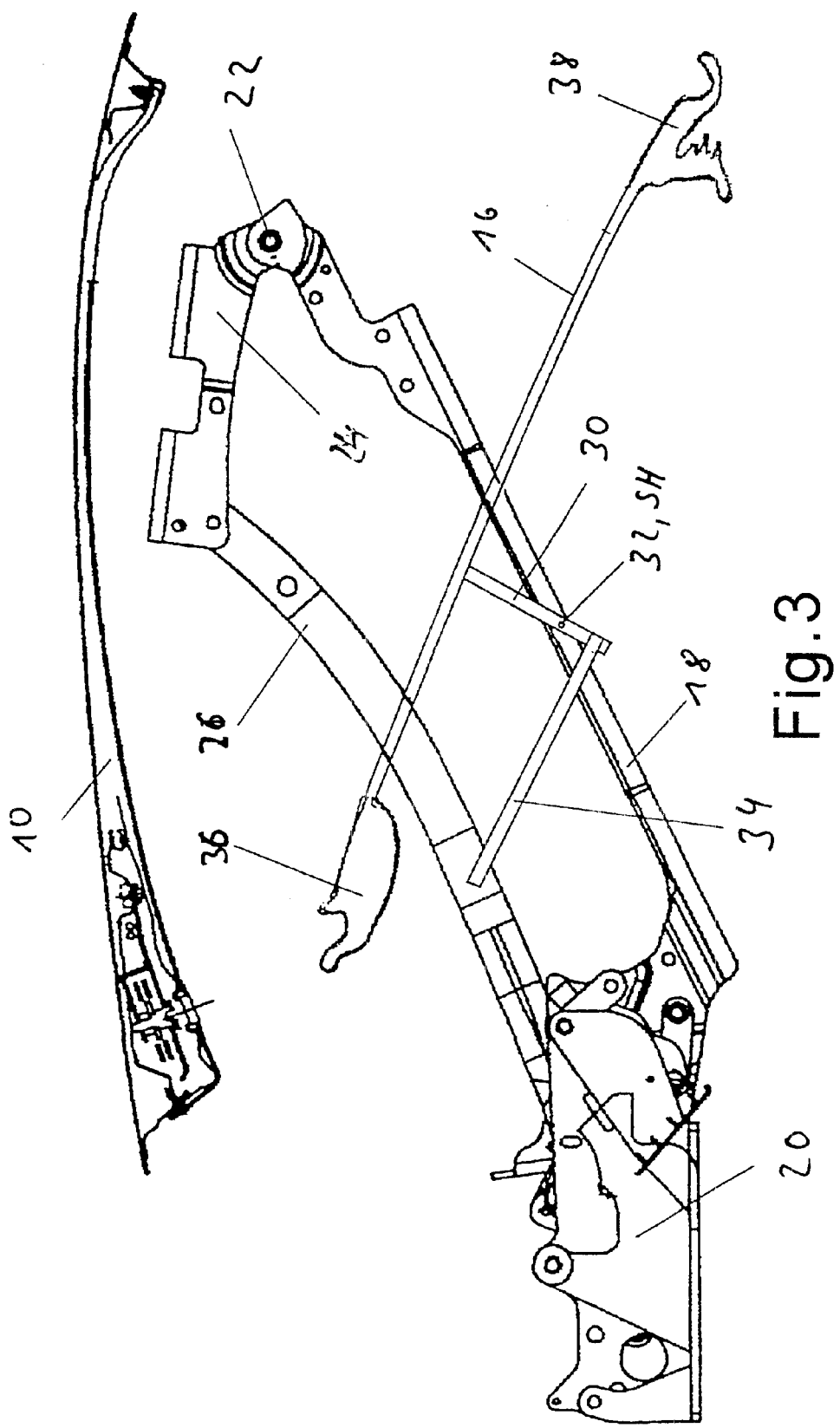
Figure 4:
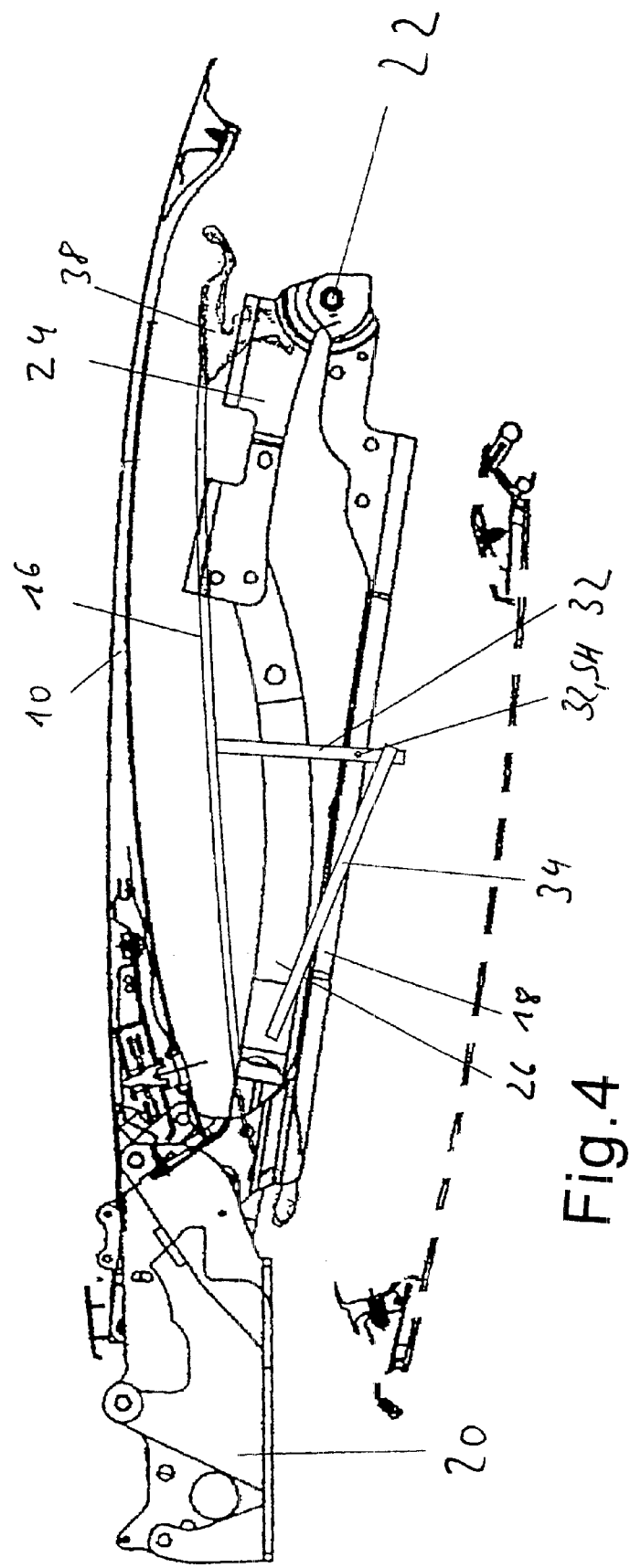
FIG. 4 shows a schematic sectional view of the fixed roof in the stored state.

From FIGS. 2 to 4, three stages of the storing process of the roof in a rear storage space can be seen, in each case in a schematic sectional view. With the main link 26 being driven via the intermediate lever 28 by a driving device (not illustrated in greater detail), at the same time the rear window 16 is also moved in a restrained manner via the restraint lever 34 and the lever 32 of the rotational drive 31. Owing the above-described arrangement of the lever and points of articulation, the rear window 16 is stored separately from the C-pillars 18 by way of the rotational drive 31, the storing movement being restrained in such a manner that the rear window 16 does not carry out any rotational movement to the rear, but merely a pivoting movement downwards and to the rear about the pivot axis SH running in the transverse direction of the vehicle in the central region of the rear window 16. The rear window 16 basically maintains its positional direction. In other words: a front and upper seal 36 remains at the front and a rear seal 38 remains at the rear.

As can be seen from FIG. 4, in the stored state the front roof part 10 and the rear window 16 therefore lie in a space-saving manner curved in the same direction or with the same curvature in the rear region of the vehicle. In FIG. 4, part of a rear window is additionally drawn in, in dashed lines, in a position which it would have in the case of a movement according to the prior art.

FIG. 5 shows, in a schematic partial perspective view from the right at the front in the direction to the rear at the top, the rear roof part 12 together with the rear window 16, a load-bearing structure 40 of the roof pillar 18 and one of the two main links 26 in the closed state of the roof. In this case, the pivot axis SH of the rear window 16, which axis extends in the central region of the rear window in the transverse direction of the vehicle, and the lever 30, which is mounted on the pivot point 32 on the load-bearing structure 40 of the roof pillar 18, can be seen, the lever, for its part, being connected fixedly to the rear window 16 via a bracket 42. The restraint lever 34, via which the lever 30 is coupled to the main link 26 for the rotational drive of the rear window 16, cannot be seen in FIG. 5. The rear, right-hand connection of the rear window 16 is designed in a mirror-symmetrical arrangement corresponding to the left-hand arrangement which can be seen, and is therefore not shown.

Figure 7:
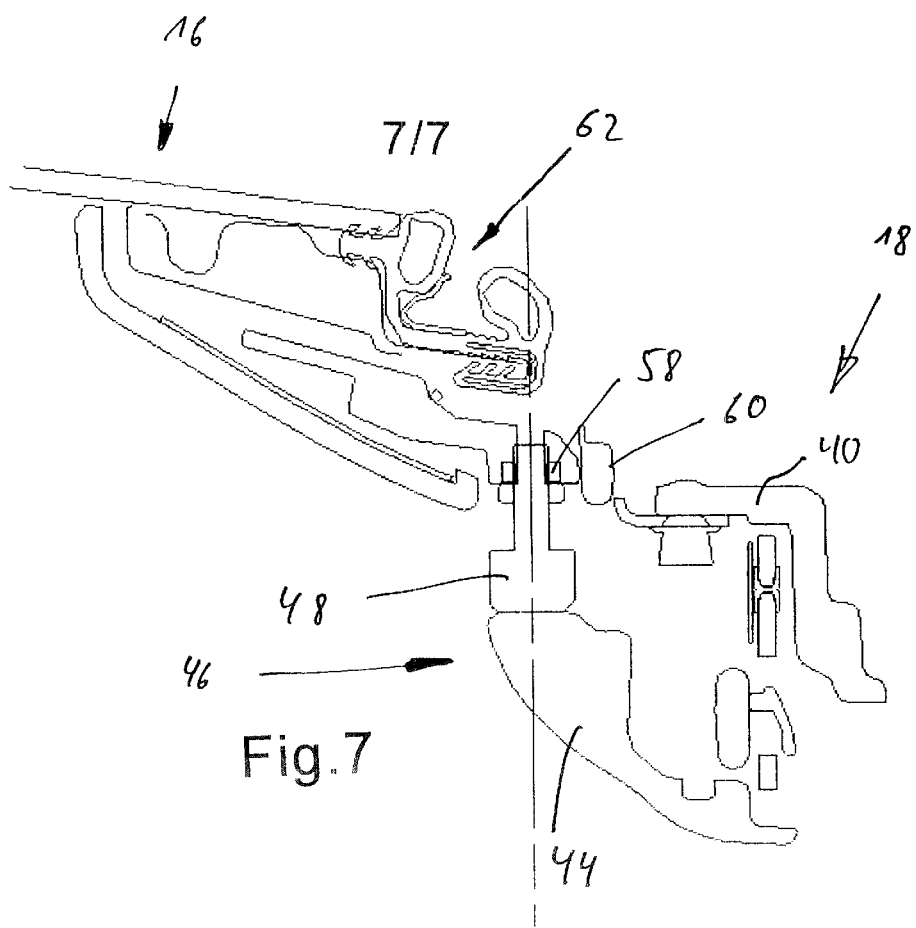
FIG. 7 shows a schematic cross section along the line VII—VII in FIG. 6 through the rear roof part in the region of the roof pillar.

In a view as in FIG. 6, which shows an enlarged partial perspective view of that region of the rear roof part 12 which is illustrated in FIG. 5, a supporting element 44 of a supporting arrangement 46 is attached fixedly above the pivot axis SH to the associated main link 26 which, when the fixed roof is closed, is moved automatically into its supporting position. The supporting element 44 on the link side is assigned a supporting element 48 which can be seen in FIG. 7, is on the window side and will be described below. The automatic pushing forward of the supporting element 44 into its supporting position when the roof is closed causes the rear window 16 to be acted upon by a rotational force ensuring the sealing seat thereof, and causes the rear window 16, which is already pressed against the seal by way of the rotational drive 31, to be rotated further through a small angular extent. In order to achieve equally good sealing on both high sides of the rear window 16, the supporting elements 44, 48, which interact with the associated, lateral edge zones of the rear window 16, are fastened to the associated main links 26 in a mirror-symmetrical arrangement on both sides of the roof.

Assemblies 50 for centering the rear window 16 are provided on the lateral roof pillars 18 at a distance below the pivot axis SH in a mirror-symmetrical arrangement on both sides. These assemblies 50, in each case, comprise a centering element 52 which is fastened to the load-bearing structure 40 of the roof pillar 18 and interacts with a corresponding centering element 54 fastened to the rear window 16. In this case, the centering element 52 can be adjusted with respect to a bracket 56, which supports it, of the load-bearing structure 40 of the roof pillar 18. By way of these centering elements 52, 54, which are arranged below the pivot axis SH, and by way of the supporting elements 44, 48 above the pivot axis SH, the rear window 16 is clamped between the C-pillars 18 in the transverse direction of the vehicle and is supported at the four points in each case against the C-pillars. This gives rise to a frictional bond between the window 16 and the roof pillars 18, the said increasing the torsional rigidity.

FIG. 7 shows a schematic cross section along the line VII—VII in FIG. 6 through the supporting element 44 on the main link side and its supporting element 48 which is on the window side. The supporting element 48 on the window side is screwed here into a thread 58 which, for its part, is connected fixedly to the rear window 16. This enables the supporting force of the supporting elements 44, 48, and therefore the rotational force ensuring the sealing seat of the window 16, to be adjusted. The above-described, automatic pushing forward of the supporting element 44 into its supporting position when the roof is closed is achieved by the main link 26 supporting the supporting element 44 being retracted into its starting position when the roof is closed. The supporting element 48 is supported laterally against a support 60 fastened to the load-bearing structure 40 of the roof pillar 18. The support 60 can be adjusted in the process, in particular in the transverse direction of the vehicle. From the sealing seat, a sealing profile 62 on the window side can be seen, the profile, when acted upon by the rotational force of the rotational drive or of the supporting device 46, being pressed against a second sealing profile 64, which can be seen in FIG. 8, on sides of the roof pillar 18. The sealing profile 62 is arranged on the inside and the second sealing profile 64 is arranged on the outside.

Figure 8:
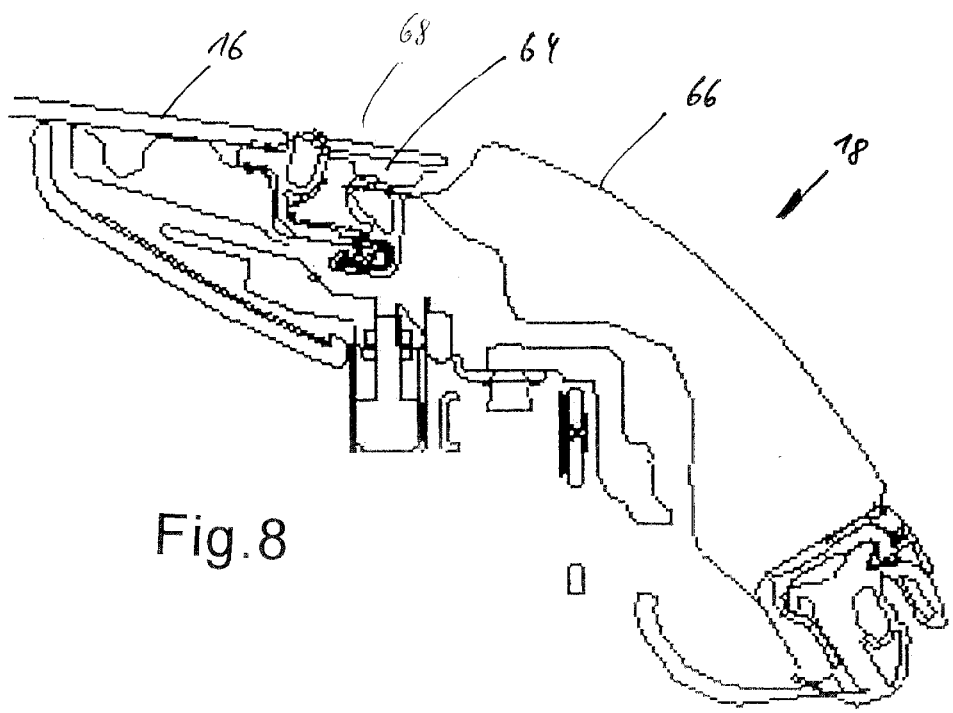
FIG. 8 shows a schematic cross section along the line VIII—VIII in FIG. 6 through the rear roof part in the region of the roof pillar.

FIG. 8 shows a schematic cross section along the line VIII—VIII in FIG. 6 through the rear window 16, part of which can be seen, and the roof pillar 18. From the roof pillar 18, a pillar covering 66 supporting the second sealing profile 64 can be seen, a window section 68 which is matched to the rear window 16 and remains fixed on the roof pillar 18 being provided on the outside of the second sealing profile 64. The window section 68 lies in a plane with the rear window 16. So that the rear window can be pivoted with respect to the roof pillars 18, the rear window is of wider design above the pivot axis SH than below the same and is therefore of slightly T-shaped design. In accordance with this, the left-hand and right-hand window section 68 remaining fixed on the roof pillar 18 are of approximately L-shaped design. In the region above the pivot axis—as described above—the sealing profile 62 on the window side is arranged on the inside and the second sealing profile 64 on the pillar side is arranged on the outside. In the region below the pivot axis SH, the sealing profile 62 on the window side is situated on the outside and the second sealing profile 64 on the pillar side is arranged on the inside.

Of course, it would also be conceivable to arrange the supporting elements of the supporting arrangement separately from the main links and press them against the rear window via a linear drive, for example. A central region of the upper edge zone of the rear window would also be conceivable in particular here as the engagement point.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle having a fixed roof which can be opened and has a front and a rear roof part which are connected to each other in an articulated manner and, controlled by way of a main link arrangement, can be shifted between a closing position and a storage position in a rear storage space, having a fixed rear window which is mounted pivotably on lateral roof pillars and a pivot axis of said rear window running in a central region of the rear window in a transverse direction of the vehicle, the rear window being driven in a rotational manner relative to the roof pillars during opening and closing movement of the fixed roof, and the rear window, after reaching the closing position of the fixed roof, being pressed via a rotational drive against a sealing seat interacting with the rear window, wherein a supporting arrangement is provided, the arrangement comprising at least one supporting element which, when pushed forward, enables the rear window to be acted upon by a rotational force ensuring the sealing seat of the rear window.

2. Motor vehicle according to claim 1, wherein each said supporting element of the supporting arrangement acts on the rear window at a distance above the pivot axis.

3. Motor vehicle according to claim 2, wherein two of said supporting element interact in a mirror-symmetrical arrangement with associated, lateral edge zones of the rear window.

4. Motor vehicle according to claim 3, wherein the supporting elements are attached to associated main links and, when the fixed roof is closed, are moved automatically into respective supporting positions.

5. Motor vehicle according to claim 4, wherein the supporting elements are of adjustable design.

6. Motor vehicle according to claim 2, wherein an assembly for centering the rear window is provided at a distance below the pivot axis.

7. Motor vehicle according to claim 6, wherein a respective centering element is arranged in a mirror-symmetrical arrangement on the lateral roof pillars, the centering element interacting with a corresponding centering element of the rear window.

8. Motor vehicle according to claim 1, wherein the rear window is of wider design above the pivot axis than below.

9. Motor vehicle according to claim 1, wherein the roof pillars have a stiffened load-bearing structure in a region of the pivot axis of the rear window.

10. An openable fixed roof for a motor vehicle, comprising:

a front and a rear roof part being articulatedly connected to each other, a main link arrangement which operatively controls the roof parts to shift between a closing position and a storage position in a rear storage space, a fixed rear window being mounted pivotably on lateral roof pillars and being operatively rotationally driven relative to the roof pillars during opening and closing movement of the fixed roof, a pivot axis of the rear window running transversely in a central region of the rear window, the rear window, after reaching the closing positions of the fixed roof in use, being pressed via a rotational drive against a sealing seat interacting with the rear window, and a supporting arrangement which comprises at least one supporting element, wherein, when operatively pushed forward, the supporting element enables a rotational force to act on the rear window ensuring the sealing seat.

11. A fixed roof according to claim 10, wherein each said supporting element of the supporting arrangement acts on the rear window at a distance above the pivot axis.

12. A fixed roof according to claim 11, wherein two of said supporting element interact in a mirror-symmetrical arrangement with associated, lateral edge zones of the rear window.

13. A fixed roof according to claim 12, wherein the supporting elements are of adjustable design.

14. A fixed roof according to claim 11, wherein an assembly for centering the rear window is provided at a distance below the pivot axis.

15. A fixed roof according to claim 14, wherein a respective centering element is arranged in a mirror-symmetrical arrangement on the lateral roof pillars, the centering element interacting with a corresponding centering element of the rear window.

16. A fixed roof according to claim 10, wherein the rear window is of wider design above the pivot axis than below.

17. A fixed roof according to claim 10, wherein the roof pillars have a stiffened load-bearing structure in a region of the pivot axis of the rear window.

18. A method of making an openable fixed roof for a motor vehicle, comprising:

providing a front and a rear roof part, connecting the roof parts to each other in an articulated manner, providing a main link arrangement to operatively control the roof parts to thereby operatively shift the roof parts between a closing position and a storage position in a rear storage space, pivotably mounting a fixed rear window of the roof parts on lateral roof pillars, a pivot axis of the rear window running in a central region of the rear window in a transverse direction of the vehicle, and the rear window being operatively driven in a rotational manner relative to the roof pillars during opening and closing movement of the fixed roof, connecting a rotational drive to the rear window to, after operatively reaching the closing position of the fixed roof, press the rear window against a sealing seat which operatively interacts with the rear window, and providing a supporting arrangement of at least one supporting element which, when operatively pushed forward, enables the rear window to operatively be acted upon by a rotational force ensuring the sealing seat of the rear window.

19. A method according to claim 18, wherein each said supporting element of the supporting arrangement operatively acts on the rear window at a distance above the pivot axis.

20. A method according to claim 19, wherein two of said supporting element interact in a mirror-symmetrical arrangement with associated, lateral edge zones of the rear window.

21. A method according to claim 19, wherein the supporting elements are of adjustable design.

22. A method according to claim 21, wherein a respective centering element is arranged in a mirror-symmetrical arrangement on the lateral roof pillars, the centering element operatively interacting with a corresponding centering element of the rear window.

23. A method according to claim 18, wherein the rear window is of wider design above the pivot axis than below.

24. A method according to claim 18, wherein the roof pillars have a stiffened load-bearing structure in a region of the pivot axis of the rear window.

25. A method of operating an openable fixed roof of a motor vehicle, said roof having a front and a rear roof part which are connected to each other in an articulated manner, comprising:

controlling the roof parts by way of a main link arrangement to shift between a closing position and a storage position in a rear storage space, pivoting a fixed rear window which is mounted pivotably on lateral roof pillars about a pivot axis of the rear window running in a central region of the rear window in a transverse direction of the vehicle, the rear window being driven in a rotational manner relative to the roof pillars during opening and closing movement of the fixed roof, pressing the rear window, after reaching the closing position of the fixed roof, via a rotational drive against a sealing seat interacting with the rear window, and pushing forward a supporting arrangement comprising at least one supporting element enabling the rear window to be acted upon by a rotational force to ensure the sealing seat of the rear window.

* * * * *